(12) United States Patent
Goodfellow

(10) Patent No.: US 7,234,295 B2
(45) Date of Patent: Jun. 26, 2007

(54) EMISSION REDUCTION APPARATUS

(75) Inventor: Craig Lucas Goodfellow, Crowborough (GB)

(73) Assignee: Ricardo UK Limited (GB)

( * ) Notice: Subject to any disclaimer, the term of this patent is extended or adjusted under 35 U.S.C. 154(b) by 0 days.

(21) Appl. No.: 10/528,482

(22) PCT Filed: Sep. 18, 2003

(86) PCT No.: PCT/GB03/04008

§ 371 (c)(1),
(2), (4) Date: Oct. 6, 2005

(87) PCT Pub. No.: WO2004/027230

PCT Pub. Date: Apr. 1, 2004

(65) Prior Publication Data

US 2006/0090457 A1    May 4, 2006

(30) Foreign Application Priority Data

Sep. 20, 2002    (GB)    ................ 0221920.2

(51) Int. Cl.
*F01N 3/00*    (2006.01)
(52) U.S. Cl. ............... 60/288; 60/274; 60/286; 60/292; 60/295; 60/297; 60/303; 60/324
(58) Field of Classification Search ......... 60/274, 60/286, 287, 288, 292, 295, 297, 300, 303, 60/324
See application file for complete search history.

(56) References Cited

U.S. PATENT DOCUMENTS

| 5,233,831 | A | * | 8/1993 | Hitomi et al. ............... 60/284 |
| 5,802,845 | A |   | 9/1998 | Abe et al. |
| 6,122,910 | A | * | 9/2000 | Hoshi et al. ................ 60/297 |
| 6,151,890 | A | * | 11/2000 | Hoshi ........................ 60/297 |
| 6,253,547 | B1 | * | 7/2001 | Watanabe et al. ............. 60/297 |
| 6,516,612 | B1 | * | 2/2003 | Yokoi et al. ................ 60/301 |
| 6,647,710 | B2 | * | 11/2003 | Nishiyama et al. .......... 60/286 |
| 6,886,329 | B2 | * | 5/2005 | Ueda et al. ................. 60/285 |
| 2003/0010021 | A1 |  | 1/2003 | Nishiyama et al. |

FOREIGN PATENT DOCUMENTS

| EP | 0 758 714 A1 | 2/1997 |
| EP | 1 055 806 A2 | 11/2000 |
| EP | 1 170 472 A1 | 1/2002 |
| JP | 11-36846 A | 2/1999 |
| WO | WO-02/32552 A1 | 4/2002 |

OTHER PUBLICATIONS

United Kingdom Search Report dated Jan. 16, 2003 (2 pages).

* cited by examiner

*Primary Examiner*—Binh Q. Tran
(74) *Attorney, Agent, or Firm*—Osha Liang LLP

(57) ABSTRACT

An emission reduction apparatus includes first and second exhaust paths carrying respective first and second Nox traps. One trap has a smaller capacity than the other and is operative while the larger trap regenerates, allowing symmetric operation.

9 Claims, 2 Drawing Sheets

EMISSION REDUCTION APPARATUS

Figure 1:
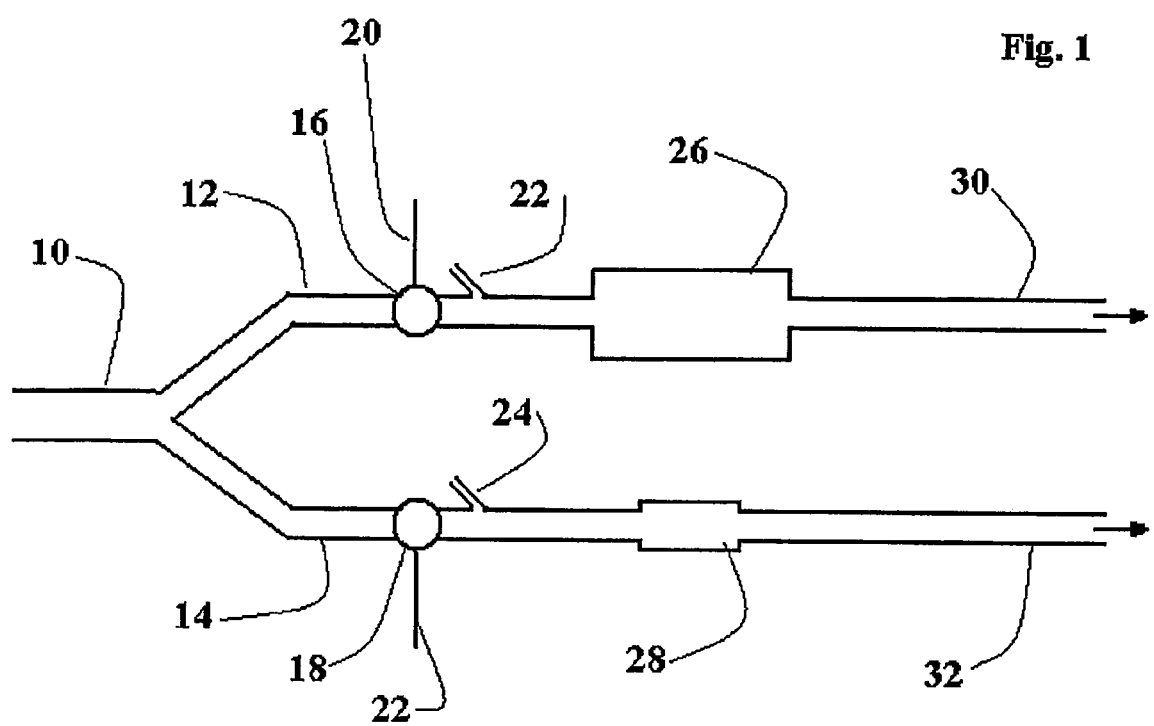

The invention relates to an emissions reduction apparatus for example for reducing noxious emissions from a vehicle engine exhaust.

One known apparatus of this type comprises a NOx trap for example of the type manufactured by Johnson Mathey of the United Kingdom. The trap comprises an exhaust inlet, an outlet and a filter between them having, on an outlet side, a NOx wash coat. The filter can be, for example, a porous ceramic such as ceramic cordierire and the wash coat a NOx absorbent, for example a precious metal and an alkaline metal dispersed into an alluminous port. NOx traps of this type in fact carry out a dual function; the porous ceramic acts as a particulate filter for particulate matter in the exhaust steam and the wash coat traps NOx as well as HC and CO.

In use the NOx trap needs to regenerate frequently, for example every 60 to 90 seconds at normal operating temperatures although this will be much shorter at low or very high temperatures. Regeneration is typically achieved by injecting fuel into the exhaust stream which induces an exothermic reaction in the filter whereby the trapped particulate material oxidises. The remaining fuel reacts with the absorbed NOx regenerating the wash coat. The regeneration period is typically 2 to 4 seconds. A trap of this type is particularly suited to diesel engine exhausts as it is suited to the lean air-fuel ratio of the exhaust gas, and is often referred to as a lean NOx trap (LNT).

European patent application number EP1055806 discusses an enhanced system including two NOx traps in parallel exhausts paths. In operation, at start up a first path is opened and a second path closed and the exhaust is hence diverted through the corresponding first NOx trap. The system identifies when the absorption capacity of the first trap is approached and enters a regeneration routine. According to this routine a second valve opens allowing the exhaust to pass into the second path, and the first valve is partially closed such that the majority of the exhaust flow is through the second path and NOx path. In practice a flow ratio of around 95% to 5% is observed. The remaining flow in the first path is sufficient to carry injected fuel to induce regeneration in the first trap. When regeneration is detected the first valve is fully closed and fuel injection is ceased, and the first trap then remains idle until the second trap approaches its absorption capacity. This process is repeated providing the advantage exhaust purification is continually carried out, switching from one trap to the other when regeneration is required. In addition the amount of fuel injected in the regenerating leg is reduced because the exhaust flow is low and the amount of oxygen in that leg therefore low. Also it is easy to achieve a high temperature from a fuel induced exothermic reaction in the regenerating leg during regeneration because the mass airflow is low. Low space velocity also stops the completeness of regeneration by ensuring sufficient residence time for full NOx conversion to $N_2$.

A problem that arises with a parallel path system such as this is that, in practice asymmetric operation is observed such that one of the two arms is favored and tends to spend proportionally more time in the emissions reduction mode.

The invention is set out in the appended claims. The invention solves various problems with the known arrangement. In particular the observed asymmetry of operation is exploited by having one emissions trap significantly smaller than the other such that it is effectively only carries out emissions reduction whilst the larger trap is regenerating. This gives rise to significantly reduced costs as the smaller capacity leg has a lower total mass loading and reduced size. Similarly it allows reduced packaging volume. Yet further it has been observed in the known systems that the regenerating leg after completion of the regeneration cools rapidly before it is switched over to trapping so that temperature management can be a significant concern. In the present case the larger trap only has a short period idle, if at all, after regeneration such that minimal temperature drop is observed and hence improved efficiency is obtained. It will be appreciated that the emissions reduction capacity can be reduced by varying any one or more of a number of parameters including physical size, length, diameter or volume, physical or thermal mass, chemical formulation or emissions reducing material.

Yet further there is a reduced fuel consumption penalty. In known symmetric parallel systems over-injection of fuel may be required in the regenerating leg to keep the temperature up which can overall increase fuel consumption. This problem is clearly reduced in the present invention as a result of the provision of the smaller trap and the generally improved temperature management. In fact the reduced size of the smaller trap requires reduced added fuel during regeneration as there is less residual oxygen in the leg to remove.

In the preferred embodiment according to which the smaller trap has a lower temperature formulation, this matches the temperature regime in the system according to which the smaller trap will tend to remain at a lower temperature allowing better conversion efficiency.

Figure 2:
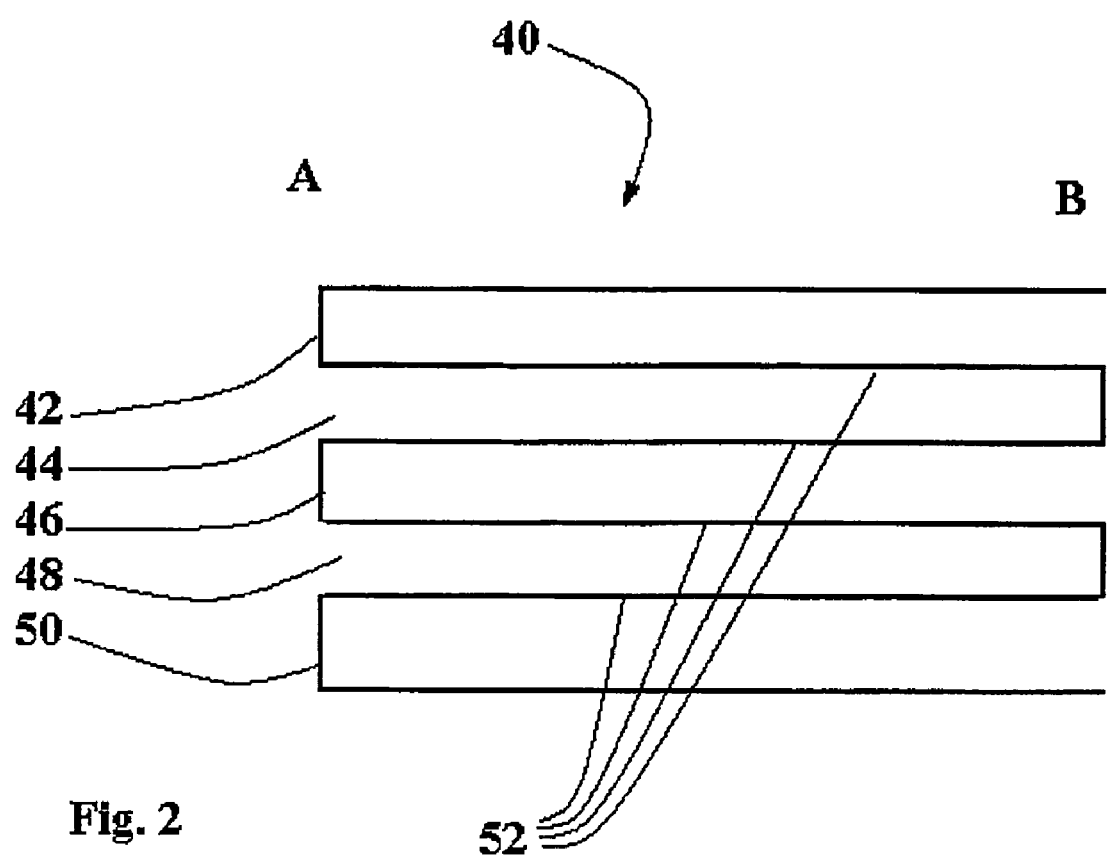

Embodiments of the invention will now be described, by way of example, with reference to the drawings of which:

FIG. 1 is a schematic view of an emission reduction apparatus according to the present invention; and FIG. 2 is a schematic view of a NOx trap including a particulate filter.

Referring to FIG. 1, an engine exhaust path 10 is split into two parallel paths 12, 14. Each path includes a respective valve 16, 18, operation of which is controlled by a respective control line 20, 22. Downstream of each valve 16, 18 a fuel injection port 22, 24 respectively is provided downstream of which are respective NOx traps 26, 28. Paths 12 and 14 continue after the respective NOx traps to any appropriate exhaust outlet 30, 32.

The general configuration of a NOx trap including a particulate filter will be well known to the skilled reader and so only a very brief description is provided here with reference to FIG. 2. In particular the trap designated generally 40 includes a plurality of passages 42, 44, 46, 48, 50. The trap has an inlet end designated generally A and an outlet end designated B and alternate passages have their inlet end closed and their outlet end open and vice versa. For example in the embodiment shown passages 42, 46, 50 have their ends closed at the inlet end A and their ends open at the inlet end B whilst passages 44 and 46 have their ends open at inlet end A and their ends closed at inlet end B. As a result exhaust gas entering passages 44 and 48 at inlet end A is forced to pass through the walls 52 between the passages in order to exit from passages 42, 46, 50. As discussed above the walls 52 are formed of a porous material to trap particulate matter and coated with a NOx wash coat to absorb NOx.

It will be seen that, according to the invention, the NOx traps 26, 28 provided on respective paths 12, 14 are of different capacities in a ratio in the region of 5:1 to 10:1 In addition, as discussed in more detail below in a preferred embodiment the smaller of the traps 28 may also have a lower temperature formulation, i.e. be designed to operate most efficiently at a lower temperature than the larger trap 26.

In operation the path 14 is initially closed by valve 18 and valve 16 is open diverting flow through path 12 and NOx trap 26. When the trap 26 is fully loaded or approaching fully loaded the regeneration phase is entered according to which valve 18 is opened and valve 16 partially closed so as to divert roughly 95% of the exhaust flow through path 14. Fuel is injected at port 22 and regeneration takes place at the trap 26. Meanwhile the trap 28 operates normally. Once the trap 28 is fully regenerated fuel injection is ceased and valve 16 fully closed such that all of the exhaust stream is diverted through the smaller trap 28. When full loading of the smaller trap 28 is sensed the operation is reversed.

The sensing and controlling steps during operation of the cycle are well-known to the skilled reader and are not discussed in detail here. For example appropriate loading and regenerating sensors can be provided on the traps 26, 28 or appropriate control logic can be implemented in an engine control unit monitoring, for example engine load or engine output, or trap temperature to assess when a full load or full regeneration are achieved. Valves 16 and 18 are then controlled by the control system such as the ECU via a control line 20 and 22, to ensure their operation at the correct times.

It will be seen that the asymmetrical capacity of the two traps gives rise to a corresponding asymmetrical operating cycle in which the larger trap tends to remain operative for a significant longer time than the smaller trap. In fact the smaller trap need only remain operative for the length of time it takes the larger trap to regenerate although its operative period should be designed to be longer than the longest possible regeneration period of the larger trap to avoid mis-operation. There will also be a temperature asymmetry as the temperature of the larger trap will build up during its emissions reduction period and also during the correspondingly longer regeneration period. As a result the smaller trap benefits from a lower temperature formulation so that its storage capacity is enhanced at lower temperature.

As a result the invention exploits the observed asymmetry of operation in known physically symmetrical systems. It is believed that the asymmetry in the known systems arises for the following reason: as the majority of the exhaust flow goes through one arm whilst the other arm regenerates, the trapping arm remains hot whilst the regenerating arm cools rapidly following the short regeneration. When the valves switch the exhaust gas flows through a comparatively cold trap. Bearing in mind that the NOx storage capacity of a trap is very temperature dependent, diverting a NOx rich exhaust stream onto a cool trap results in rapid saturation of the trap (the NOx storage capacity of a trap shows a peak somewhere in the 300 to 450° C. range depending on formulation); at low temperature (and very high temperatures) the storage capacity drops off sharply.

Because the cold leg saturates so rapidly the system switches back to the other leg before its temperature can come up to its optimum for storage. As the switch back time has been so short, by the same token the other leg is still hot and so still has high trapping efficiency. Meanwhile the cooler leg undergoes regeneration but because the amount of trap NOx is low the regeneration is short and less fuel is injected to do this, hence less of an exothermic reaction and less heating. Conversely when the other leg regenerates, as a higher proportion of NOx has been stored, a higher regeneration temperature is reached. The net effect is that very quickly a temperature asymmetry arises in operation which effectively feeds back, lengthening the operation time of one leg and reducing that of the other, even though both traps are identical.

It will be appreciated that the system of the present invention can be adapted in various ways without departing from the inventive concept. For example it can be applied to any type of emission reduction apparatus which has a temperature dependent emission reduction or regeneration regime.

Although discussion is directed in the specific embodiment described above towards a NOx trap including a particulate filter it will be appreciated that the invention will work equally well with a NOx trap excluding such a filter and including a NOx reduction component only.

The respective capacities of the two traps can be varied in terms of the volume or the temperature or other reduction formulation of the traps. Although a control scheme is described above according to which paths are switched only when the corresponding trap requires regeneration, instead the path can be switched back from the smaller trap to the larger trap path as soon as the larger trap has regenerated, that is, before the smaller trap has fully loaded, keeping the larger trap at an optimum operating temperature.

The invention claimed is:

1. An emission reduction apparatus for an engine exhaust, the apparatus comprising first and second exhaust paths and first and second regenerable emission reduction elements in the respective paths in which the first emission reduction element has a greater emission reduction capacity than the second emission reduction element, and in which the second emission reduction element has a lower operative temperature formulation than the first emission reduction element.

2. An apparatus as claimed in claim 1 in which the first and second emission reduction elements have at least one of a heat dependent regeneration regime and a heat dependent emission reduction regime.

3. An apparatus as claimed in claim 1 in which the emission reduction element comprises a NOx trap.

4. An apparatus as claimed in claim 3 in which the NOx trap includes a particulate filter.

5. An emission reduction system including an apparatus as claimed in claim 1 and a controller for controlling operation of the apparatus.

6. An engine including an exhaust providing an exhaust path and the system as claimed in claim 5 provided in the exhaust path.

7. An engine as claimed in claim 6 comprising a diesel engine.

8. A vehicle including an engine as claimed in claim 6.

9. A method of reducing engine exhaust emissions comprising switching an engine exhaust stream between first and second engine exhaust paths having first and second regenerable emission reduction elements therein, in which the second emission reduction element has a lower operative temperature formulation than the first emission reduction element, in which the exhaust stream is switched to a second path during regeneration of the regenerable element in the first path and then switched back to the first path when regeneration is complete.

* * * * *